United States Patent [19]

Suzuki

[11] Patent Number: 5,360,969
[45] Date of Patent: Nov. 1, 1994

[54] INFORMATION RECORDING AND REPRODUCING APPARATUS INCLUDING A FEED ROLLER AND FEED PLATE FOR FEEDING A RECORDING MEDIUM TO A SETTING POSITION ON A MOUNT TABLE

[75] Inventor: Kazunori Suzuki, Yokohama, Japan
[73] Assignee: Canon Kabushiki Kaisha, Tokyo, Japan
[21] Appl. No.: 764,197
[22] Filed: Sep. 23, 1991
[30] Foreign Application Priority Data
  Sep. 28, 1990 [JP] Japan .................................. 2-257500
[51] Int. Cl.⁵ .......................................... G01K 13/04
[52] U.S. Cl. .................................... 235/479; 235/475
[58] Field of Search ................ 235/454, 480, 479, 475
[56] References Cited
U.S. PATENT DOCUMENTS

| 4,735,578 | 4/1988 | Reichardt et al. | 439/152 |
| 4,800,258 | 1/1989 | Suzuki et al. | 235/475 |
| 4,900,908 | 2/1990 | Tsutsui | 235/475 |
| 4,933,537 | 6/1990 | Takahashi et al. | 235/454 |
| 4,994,658 | 2/1991 | Takahashi et al. | 235/479 |

FOREIGN PATENT DOCUMENTS 0296590 12/1988 European Pat. Off. .
0386705  9/1990 European Pat. Off. .
3602668  7/1987 Germany .

OTHER PUBLICATIONS

Patent Abstracts of Japan, Kokai No. 58-113057, vol. 7, No. 217, Sep. 1983.
Patent Abstracts of Japan, Kokai No. 01-191376, vol. 13, No. 482, Nov. 1989.
Patent Abstracts of Japan, Kokai No. 02-177058, vol. 14, No. 449, Sep. 1990.

Primary Examiner—David C. Nelms
Assistant Examiner—John R. Lee
Attorney, Agent, or Firm—Fitzpatrick, Cella, Harper & Scinto

[57] ABSTRACT

An information recording/reproducing apparatus for recording/reproducing information by holding an information recording medium on a mount table and reciprocating the mount table relative to a recording/reproducing head, includes a loading device for loading the recording medium into the mount table and a setting device for setting the position, on the mount table, of the recording medium loaded to the mount table by the loading device. The setting device sets the recording medium in association with the loading operation of the loading device.

3 Claims, 7 Drawing Sheets

INFORMATION RECORDING AND REPRODUCING APPARATUS INCLUDING A FEED ROLLER AND FEED PLATE FOR FEEDING A RECORDING MEDIUM TO A SETTING POSITION ON A MOUNT TABLE

BACKGROUND OF THE INVENTION

1. Field of the Invention

The present invention relates to an information recording and reproducing apparatus for recording information on a recording medium and/or reproducing the information recorded on the recording medium.

2. Related Background Art

An information recording and reproducing apparatus includes a magnetic type and an optical type. Of those, the optical type has been recently attracting notice. An apparatus for recording/reproducing information by using a light beam uses a disk-shaped rotary recording medium such as a CD, an optical disk (video disk) of a magneto-optical disk, and a card-shaped reciprocal recording medium such as an optical card or an optical tape. Those media are selectively used depending on the purpose. Of those, the optical card has been attracting notice because of its high portability. When the optical card is used as the information recording medium, a light beam is irradiated to the optical card and the light beam irradiation position is linearly moved and it is further moved transversely to the direction of the linear movement, that is, in a direction transverse to the information tracks on the optical card, as is known in the art.

Figure 1:
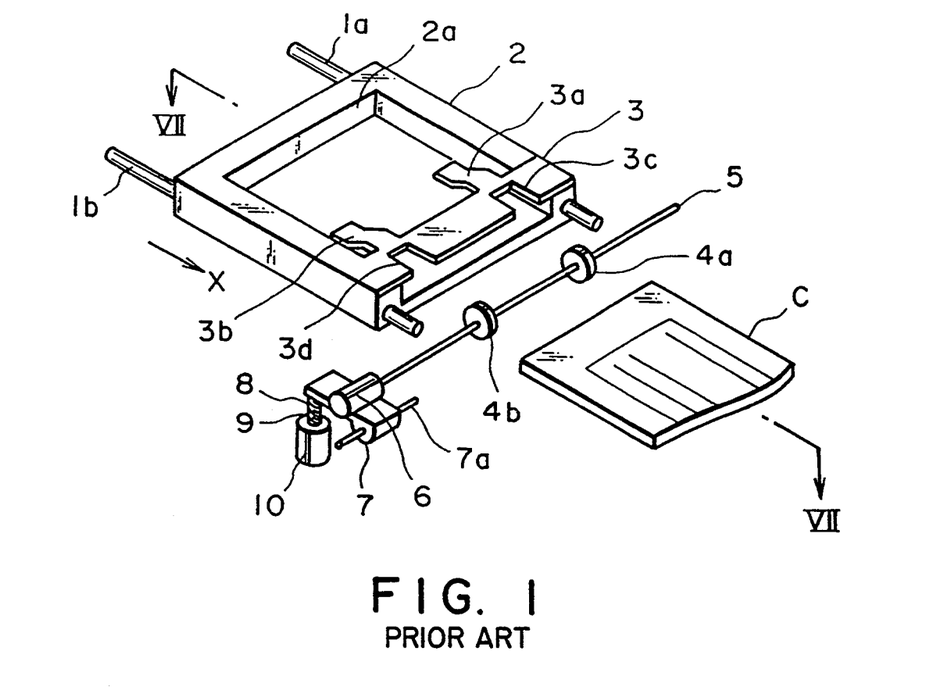
FIG. 1 shows a perspective view of a prior art device.

Prior art devices of this type are shown in FIGS. 1 to 4B. FIG. 1 shows a perspective view of a first prior art device. A mount or card table 2 movably supported along an X direction by rails 1a and 1b pushes and fixes an optical card C inserted from the side by leaf springs 3a and 3b of a card pushing member 3 in a periphery of the optical card C. Feed rollers 4a and 4b for loading the optical card C into the card table 2 are rotated by a motor 6 through a drive shaft 5 to feed the optical card C. In order to feed the optical card C to an abutment 2a of the card table 2, notches 3c and 3d are formed in the card pushing member 3 so that the feed rollers 4a and 4b engage with the notches 3c and 3d. The motor 6 and the drive shaft 5 are movable vertically because a movable core 8 fixed to one end of a member 7 which is rotatable around a shaft 7a is driven by a spring 9 and a solenoid 10.

Figure 2A:
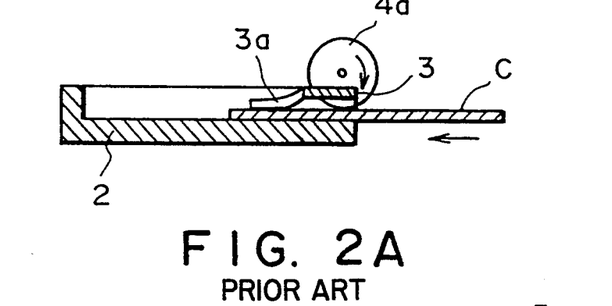
FIGS. 2A and 2B illustrate an operation of the prior art device shown in FIG. 1.
Figure 2B:
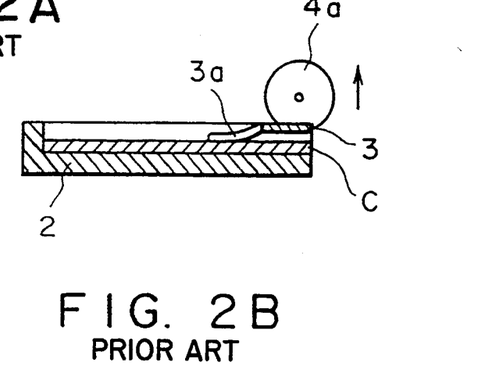

FIG. 2 shows a sectional view taken along a line VII—VII of FIG. 1. FIG. 2A shows the loading of the optical card C into the card mount 2, and FIG. 2B shows the feed rollers 4a and 4b which are the feed system off the card table 2. When the optical card C is fed to the abutment 2a of the card table 2 by the feed rollers 4a and 4b and the optical card C is positioned to the card table 2, the motor 6 stops and the feed rollers 4a and 4b move up by the solenoid 10 and move off the feed status for the optical card C. The optical card C positioned to the card table 2 moves off the feed system and makes a linear reciprocating movement with the card table 2 so that the information is recorded or reproduced.

Figure 3:
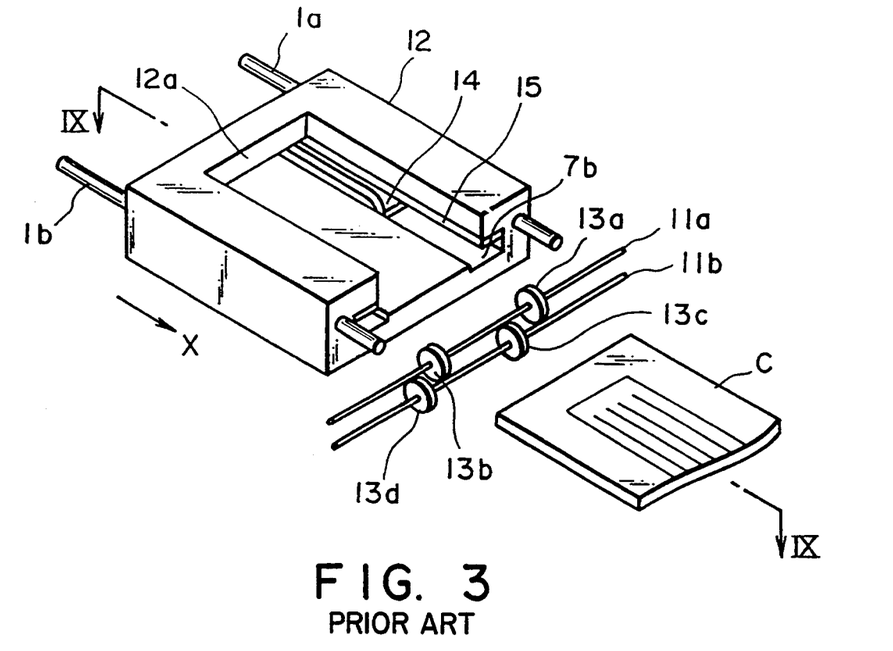
FIG. 3 shows a perspective view of another prior art device.
Figure 4A:
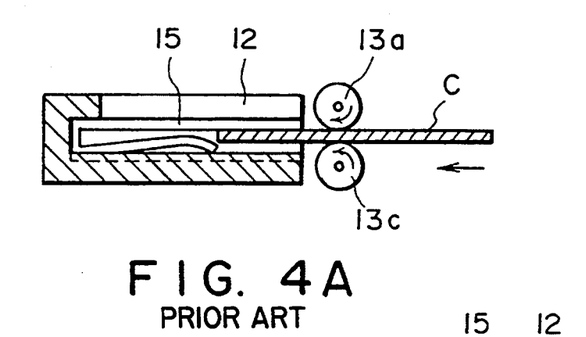
FIGS. 4A and 4B illustrate an operation of the prior art device shown in FIG. 3.
Figure 4B:
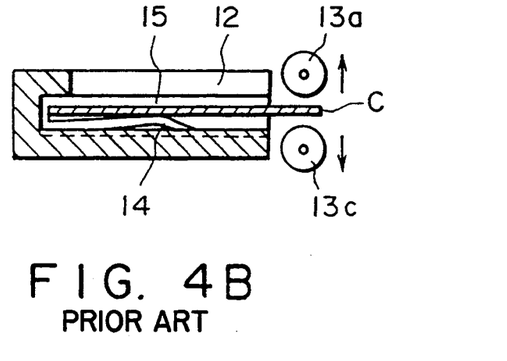

FIG. 3 shows a second prior art device. Feed rollers 13a, 13b, 13c and 13d for loading the optical card C into a card table 12 are provided on vertically arranged parallel shafts 11a and 11b and they are arranged to face each other to hold the optical card C therein. In order to load the optical card C to an abutment 12a of the card table 12, the length of the card table 12 along the direction of movement is shorter than the longitudinal length of the optical card C and the feed rollers 13a to 13d are arranged thereat. As shown in FIG. 4A, which is a sectional view taken along a line IX—IX of FIG. 3, the optical card C is held by the feed rollers 13a to 13d and fed to the card table 12. The optical card C is loaded while it is forced by a card pushing member 14 so that it is parallel to a pushing plane 15, and when the optical card C abuts against the abutment 12a of the card table 12, the positioning is completed. When the optical card C is positioned, the feed rollers 13a, 13b, 13c and 13d are vertically moved as shown in FIG. 4B to isolate the optical card C from the feed system. Subsequently, the recording/reproducing mode which is similar to that of the first prior art device is started.

However, in the above mechanisms which use the feed rollers, the following common disadvantages are observed. In the first prior art device, since portions of the pushing member 3 which pushes the optical card C are cut away, a warp of the optical card is not fully removed, and the optical card C swings significantly in the recording/reproducing mode to induce a recording-/reproducing error of the optical head. In the second prior art device, a portion of the optical card C extends beyond the card table 12 and it poses a similar problem to that of the first prior art device. In both prior art devices, the feed rollers which feed the optical card C are so close to the card table on which the optical card C is mounted that the linear reciprocating movement is interfered with. Accordingly, it is necessary to retract the feed rollers to isolate them from the card table immediately after the positioning of the optical card C when the optical card C is received by the card table. Since the feed rollers are usually made of rubber elastic material, a variation is produced on a contact plane of the optical card C and the feed rollers by a restoring repulsive force created when the feed rollers move off the optical card C. As a result, a write position varies and sometimes the irradiation beam of the optical head may be positioned at other than a record area of the optical card C. Because of those disadvantages, it is difficult by the prior art devices to minimize an information record pit size as required by the present technology and record/reproduce information to/from the optical card which stores a large volume of information.

SUMMARY OF THE INVENTION

It is an object of the present invention to provide a highly reliable information recording/reproducing apparatus which positively feeds an optical card and positions it to a mount table with high precision.

The above object of the present invention is attained by an information recording/reproducing apparatus for recording/reproducing information by holding an information recording medium on a mount table and reciprocating the mount table relative to a recording/reproducing head, comprising load means for loading the recording medium into the mount table and setting means for setting the position, on the mount table, of the recording medium loaded to the mount table by the load means. The setting means sets the recording medium in association with the load operation of the load means.

DETAILED DESCRIPTION OF THE PREFERRED EMBODIMENTS

The present invention is now explained in detail with reference to the embodiments shown in FIGS. 5 to 9.

Figure 5:
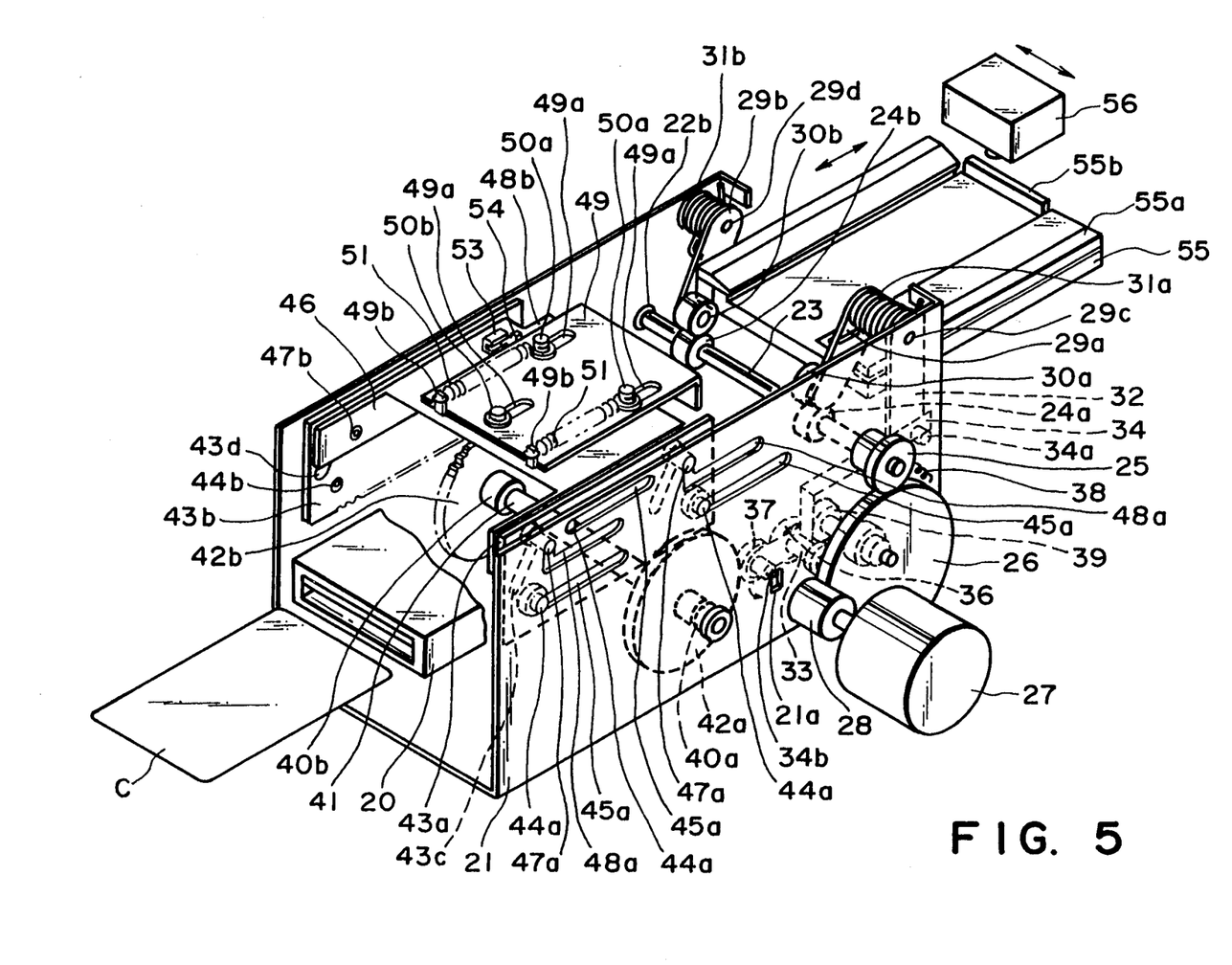
FIG. 5 shows a perspective view of one embodiment of an information recording/reproducing apparatus of the present invention.
Figure 6:
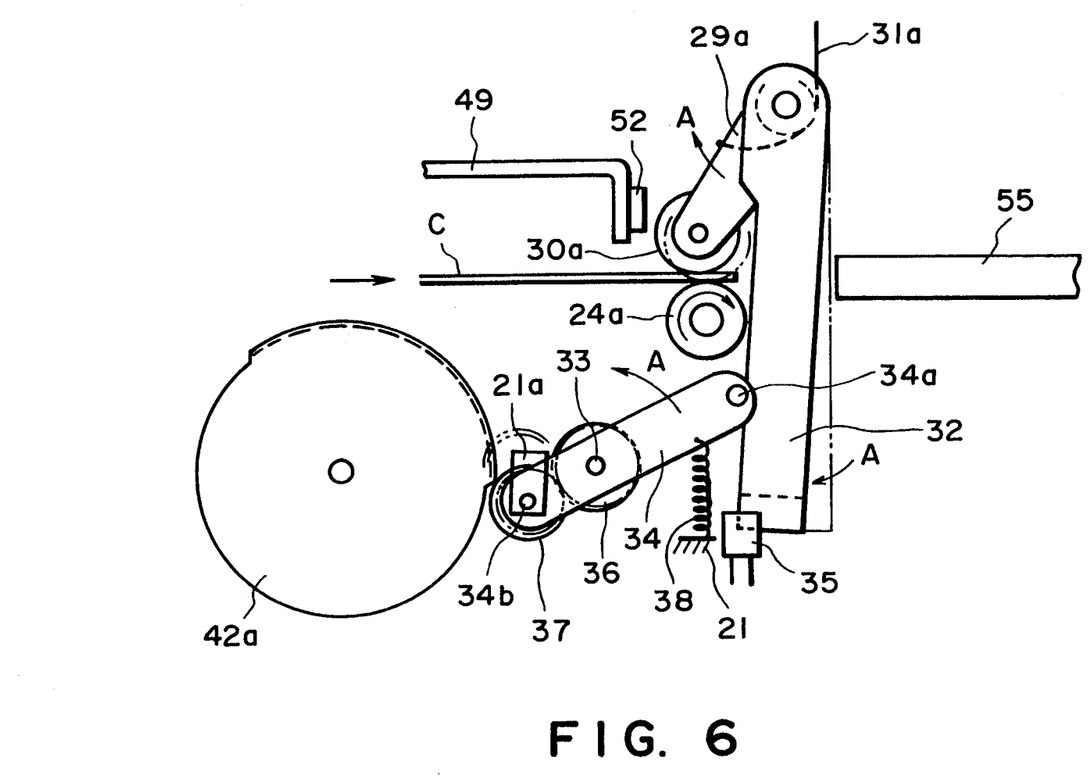
FIGS. 6 and 7 illustrate an operation of the apparatus shown in FIG. 5.

In FIG. 5, an insertion opening 20 for an optical card C is fixed to a feed frame 21 at a portion not shown and it also serves as a feed guide for the optical card C. A drive shaft 23 supported by the feed frame 21 through bearings 22a and 22b is disposed in a vicinity of an inner end of the insertion opening 20 to rotate drive rollers 24a and 24b fixed to the drive shaft 23 in a feed direction. A drive gear 25 is mounted at a right end of the drive shaft 23 and a reduction gear 26 meshes thereto. A motor gear 28 directly coupled to a drive motor 27 meshes with the reduction gear 26. Support arms 29a and 29b are fixed at ends of support shafts 29c and 29d rotatably supported by the feed frame 21 diagonally above the drive shaft 23, and actuation rollers 30a and 30b are rotatably mounted at ends of the support arms 29a and 29b to abut against the drive rollers 24a and 24b. The support arms 29a and 29b are driven by actuation springs 31a and 31b, respectively, having first ends thereof fixed to the feed frame 21, and the actuation rollers 30a and 30b are driven by the drive rollers 24a and 24b, respectively. A lever 32 longer than the support arm 29a is attached to a base of the support shaft 29c to extend downward, and a projection portion 34a at a front end of a pendulum arm 34 rotatably supported by a shaft 33, which is fixed behind the feed frame 21, abuts against the lever 32. A sensor 35 is fixed in a vicinity of an end of the lever 32 as shown in FIG. 6 to detect the position of the lever 32. An idler gear 36 is rotatably mounted on the shaft 33, and a pendulum gear 37 rotatably mounted on a pendulum shaft 34b at a rear end of the pendulum arm 34 meshes with the idler gear 36. The pendulum arm 34 is biased counterclockwise by a spring 38 having one end thereof fixed to the feed frame 21, and it is regulated by the pendulum shaft 34b extending through a stopper hole 21a formed in the feed frame 21. A coupling gear 36 connected to the reduction gear 26 is arranged behind the idler gear 36 and meshed with the idler gear 36. A coupling shaft 41 which is parallel to the drive shaft 23 is rotatably arranged behind the pendulum gear 37 through bearings 40a and 40b to permit a move gear 42a fixed to a right end thereof to mesh with the pendulum gear 37. When the actuation rollers 30a and 30b are in contact with the drive rollers 24a and 24b, the pendulum arm is in a horizontal position and a distance between the move gear 42a and the pendulum gear 37 is minimum so that those gears mesh with each other. A move gear 42b which is linked to the move gear 42a is fixed to a left end of the coupling shaft 41, and they mesh with racks at bottoms of side plates 43a and 43b located above the move gears 42a and 42b, respectively. Guide pins 44a and 44b project from the side plates 43a and 43b and they engage with linear guide grooves 45a and 45b formed in a side plate of the feed frame 21 to support the side plates 43a and 43b such that they are movable only back and forth. A setting base 46 is arranged across the insertion opening 20 on the inner sides of the side plates 43a and 43b. Guide pins 47a and 47b project from the left and right sides of the setting base 46. They extend through oblique grooves 43c and 43d formed in the side plates 43a and 43b and are slidably supported by L-shaped grooves 48a and 48b formed in the feed frame 21. A setting dumper plate 49 having a downward curved portion at a front thereof is arranged on the setting base 46, and guide pins 50a and 50b fixed to the upper plane of the setting base 46 are fitted to slots 49a formed in the setting dumper plate 49. The setting dumper plate 49 is slidably supported by the setting base 46 so that it is slidable only back and forth by the length of the slot 49a. First ends of tension springs 51 are hooked to hooks 49b formed at the rear portion of the setting dumper plate 49 and the other ends thereof are supported by the guide pins 50a so that the setting dumper plate 49 is kept tensioned forward. An outer surface of the downward curved portion of the setting dumper plate 49 is used as a pushing portion for the optical card C and it is provided with a resin or rubber setting block 52 as shown in FIG. 6. A sensor 53 is fixed to the setting base 46, and a relative position error to the setting dumper plate 49 is detected by a detection member 54 attached to the setting dumper plate 49. A card table 55 is movably supported in front of the drive rollers 24a and 24b by a mechanism not shown. The card table 55 presses and fixes the optical card C loaded from the rear by a card pressing member 55a in a periphery of the optical card C. An abutment 55b for positioning the optical card C is provided in the front thereof. Prior to the loading of the optical card C, the card table 55 is positioned and locked along the feed path of the drive rollers 24a and 24b by a mechanism not shown. Numeral 56 denotes an optical head for recordingly reproducing information to/from the optical card C.

Figure 7:
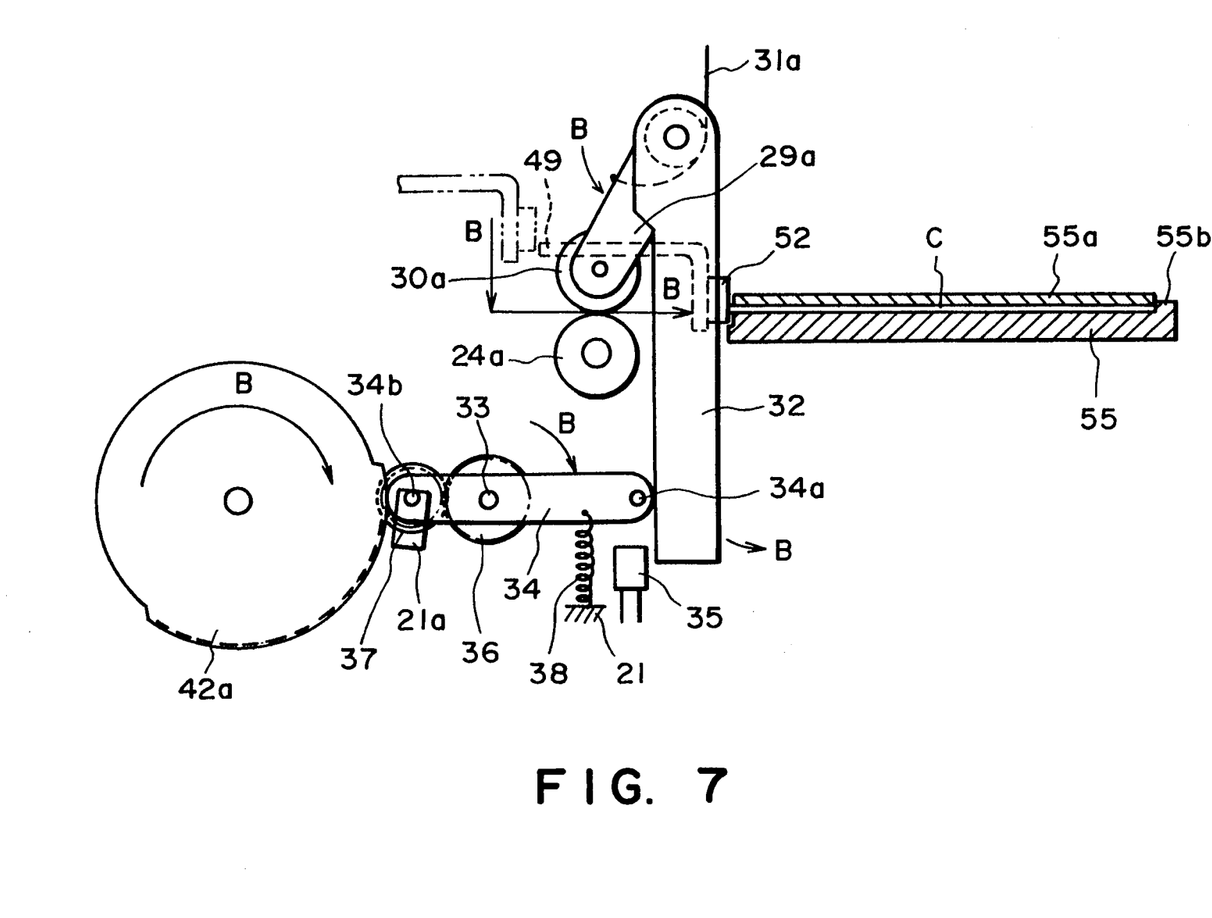

An operation is now explained. When the optical card C is inserted from the insertion opening 20 and held between the drive rollers 24a and 24b and the actuation rollers 30a and 30b as shown in FIG. 6, the actuation rollers 30a and 30b are raised by the thickness of the optical card C, and the support arm 29a and the lever 32 connected thereto are rotated in the direction A to raise the pendulum arm 34 by the projection 34a so that the pendulum gear 37 held by the pendulum arm 34 moves off the move gear 42a. The sensor 35 detects the movement of the end of the lever 32 to drive the drive motor 27. The drive force is transmitted from the motor gear 28 to the drive rollers 24a and 24b of the drive shaft 23 through the reduction gear 26 and the drive gear 25, and the optical card C is held between the rotating drive rollers 24a and 24b and the actuation rollers 30a and 30b and fed toward the card table 55. When the optical card C moves off the drive rollers 24a and 24b and the actuation rollers 30a and 30b, the support arms 29a and 29b and the lever 32 which are biased by the biasing springs 31a and 31b around the support shafts 29c and 29d as shown in FIG. 7 rotate in the direction B. When they return to the initial positions, the pendulum arm 34 rotates around the idler gear shaft 33, and the pendulum gear 37 meshes with the move gear 42a to transmit the rotation force of the drive motor 27 to the move gear 42a through the coupling gear 39. During the series of operations, the direction of rotation of the drive motor 27 is constant, and when the optical card C moves off the drive rollers 24a and 24b, the pendulum arm 34 is substantially continuously switched to the move gear 42a so that the move gear 42a transmits the rotation.

When the side plates 43a and 43b start the forward movement, the setting base 46 slides down along the oblique grooves 43c and 43d of the side plates 43a and 43b because the guide pins 47a and 47b are regulated by the L-shaped grooves 48a and 48b. The descent terminates when it reaches the lowermost ends of the oblique grooves 43c and 43d. Then, it horizontally moves forward along the horizontal portions of the L-shaped grooves 48a and 48b. In this manner, the movement of the setting base 46 from the descent to the horizontal movement is continuously conducted. The setting damper plate 49 on the setting base 46 horizontally moves from the descend position and actuates the longitudinal rear end of the optical card C to abut it against the abutment 55b formed on the card table 55. As shown in FIG. 7, the setting dumper plate 49 stops at the position at which the optical card C is set to the abutment 55b, and only the setting base 46 overruns. Accordingly, after the optical card C is set to the card table 55, the setting base 46 further overruns to apply a drive force to the setting dumper plate 49 so that the optical card C is positively set to the card table 55. Since there is a difference corresponding to the distance of the overrun between the setting base 46 and the setting dumper plate 49, the setting of the optical card C is detected by the detection member 54 and the sensor 53.

The optical card C positioned to the card table 55 makes a linear reciprocating movement for recording-/reproducing information. The setting dumper plate 49 stands by while it blocks the feed path for the optical card C. Accordingly, even if an operator inadvertently tries to insert another optical card, the optical card is stopped by the setting dumper plate and the double insertion of the optical card C is prevented. The setting dumper plate 49 can accelerate the initial rise speed of the card table 55 by the biasing force of the tension spring 51 and decelerate the card table 55 as a dumper when the card table 55 is to be stopped.

In this manner, the optical card C can be positioned to the card table 55 with a high precision by the setting dumper plate 49. By actuating the rear end of the optical card C positioned to the card table 55, the rise speed of the card table 55 is enhanced, and the recording/reproducing speed is increased. Since the optical card C is firmly held, a focusing error and a tracking error due to the vibration of the optical card C during the recording-/reproducing mode are reduced. Further, since the positioning of the optical card C to the card table 55 is checked in the position setting, an extra burden to the card table 55 is avoided and the card table 55 may be of light weight to attain high speed recording/reproducing.

Figure 8:
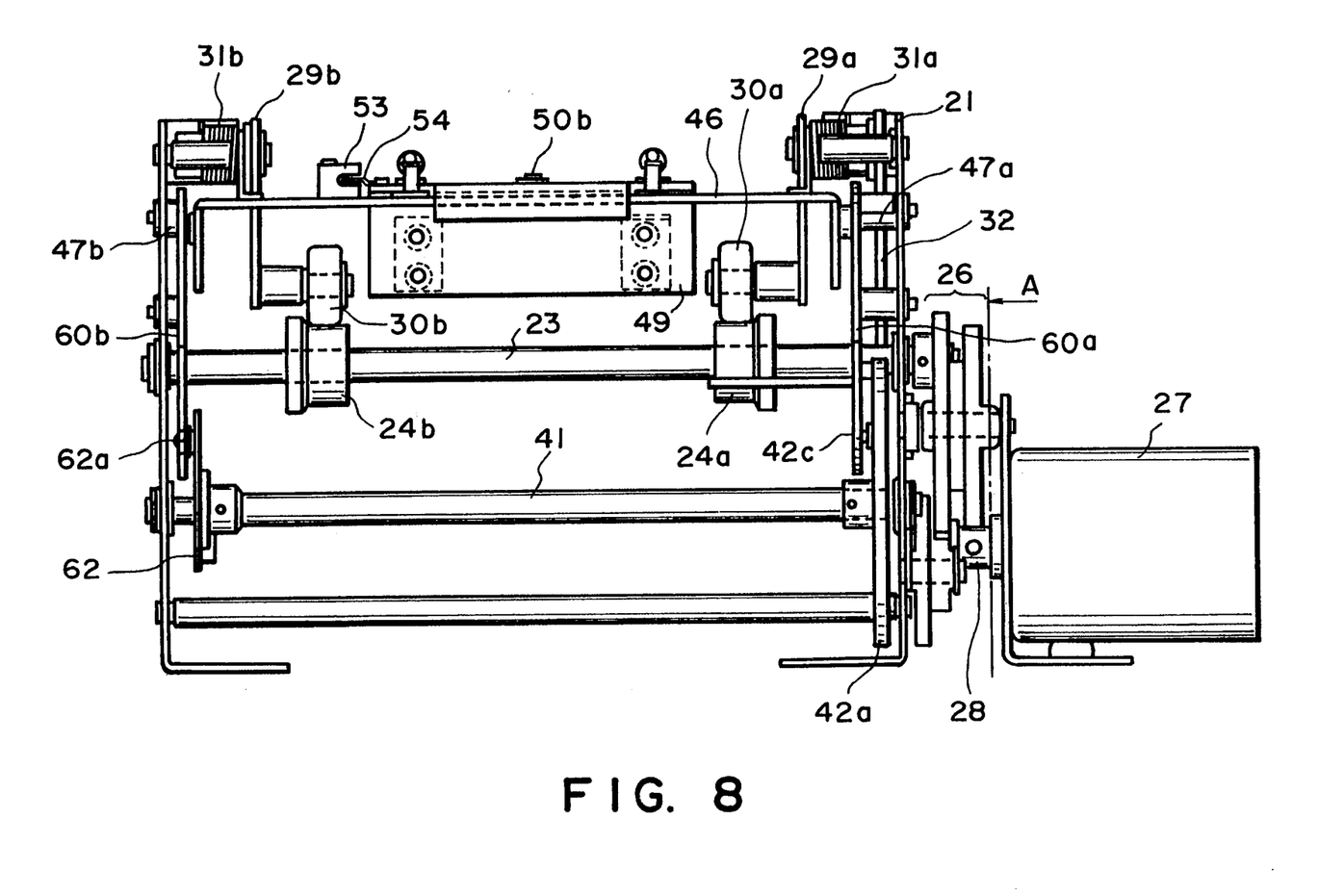
FIG. 8 is a front view of another embodiment of the information recording/reproducing apparatus of the present invention.
Figure 9:
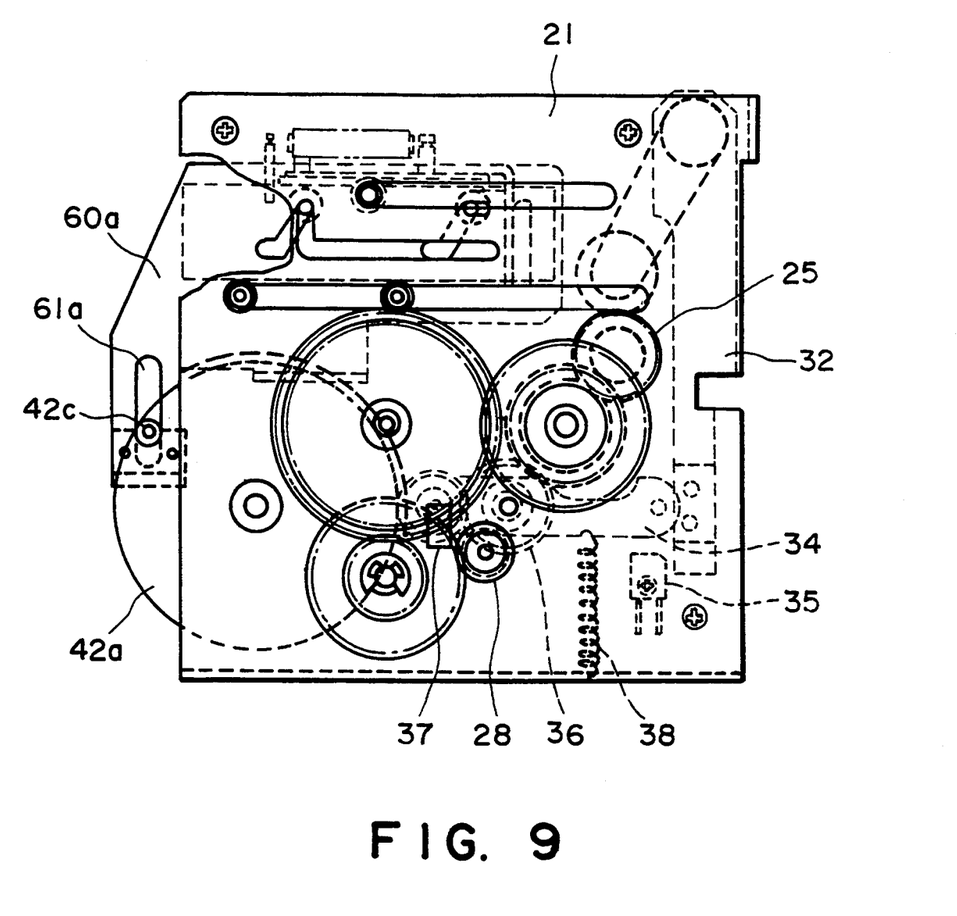
FIG. 9 shows a side view of the apparatus shown in FIG. 8.

Another embodiment is now explained with reference to FIGS. 8 and 9. Only the differences from the previous embodiment are explained below. A rotary ring 42c rotatably mounted on a shaft which is normal to the plane in a vicinity of a circumference on a side of a move gear 42a engages with a groove 61a formed in a side plate 60a to translate a rotation movement of the move gear 42a to a link movement of the side plate 60a through a groove 61a in order to linearly move the side plate 60a. A cam plate 62 is fixed to a left end of the coupling shaft 41 and it is coupled to the left hand side plate 60a through the rotary ring 62a and the groove 61b.

In the present embodiment, the side plates 60a and 60b make the linear movement as the side plates 43a and 43b of the previous embodiment In the information recording medium device of the present invention, since the positioning setting means for the optical card which is operated in connection with the optical card load means is provided, the positioning of the optical card is exactly done and the optical card is firmly and precisely held on the mount table. Accordingly, highly reliable, high speed and high density recording/reproducing of information is attained.

What is claimed is:

1. An information recording/reproducing apparatus for recording/reproducing information by holding a card-like information recording medium in a setting position on a mount table and reciprocating the mount table relative to a recording/reproducing head, said apparatus comprising:
   a feed roller for feeding the recording medium in a feeding direction nearly up to the setting position on the mount table in a feeding operation;
   a driving source for driving the feed roller and a feed plate; and
   a feed plate, being driven by said driving source and being operated in association with the feeding operation of said feed roller, for feeding the recording medium from the feed roller to the setting position on the mount table, said feed plate pressing the recording medium at an end thereof relative to the feeding direction of the recording medium.

2. An information recording/reproducing apparatus according to claim 1, further comprising means for preventing double loading of the recording medium.

3. An information recording/reproducing apparatus according to claim 1, wherein said information recording/reproducing apparatus is an optical information recording/reproducing apparatus.

* * * * *